United States Patent
Scheuering et al.

(10) Patent No.: US 7,817,831 B2
(45) Date of Patent: Oct. 19, 2010

(54) METHOD FOR IDENTIFICATION OF A CONTRASTED BLOOD VESSEL IN DIGITAL IMAGE DATA

(75) Inventors: Michael Scheuering, Erlangen (DE); Michael Sühling, Erlangen (DE)

(73) Assignee: Siemens Aktiengellsellschaft, Munich (DE)

(*) Notice: Subject to any disclaimer, the term of this patent is extended or adjusted under 35 U.S.C. 154(b) by 1080 days.

(21) Appl. No.: 11/506,884

(22) Filed: Aug. 21, 2006

(65) Prior Publication Data

US 2007/0047792 A1 Mar. 1, 2007

(30) Foreign Application Priority Data

Aug. 22, 2005 (DE) .................. 10 2005 039 685

(51) Int. Cl.
*G06K 9/00* (2006.01)
(52) U.S. Cl. ..................................... 382/128
(58) Field of Classification Search ......... 382/128–132, 382/173
See application file for complete search history.

(56) References Cited

U.S. PATENT DOCUMENTS

| | | | | |
|---|---|---|---|---|
| 5,070,322 A | * | 12/1991 | Fujihira | 340/653 |
| 6,075,871 A | * | 6/2000 | Simanovsky et al. | 382/100 |
| 2005/0031202 A1 | * | 2/2005 | Accomazzi et al. | 382/173 |

FOREIGN PATENT DOCUMENTS

| | | | |
|---|---|---|---|
| JP | 2006-122578 | * | 5/2006 |
| WO | WO 2004/068412 | * | 8/2004 |

OTHER PUBLICATIONS

Tobias et al. ("New Vessel Analysis Tool for Morphometric Quantification and Visualization of Vessels in CT and MR Imaging Data Sets", Radiographics 2004, vol. 24, pp. 287-297).*
T.Boskamp et al.: "New Vessel Analysis Tool for Morphometric Quantification and Visualization of Vessels in CT and MR Imaging Data Sets", RadioGraphics 2004, vol. 24, pp. 287-297.
German Office Action for corresponding German application No. 10 2005 039 685.2 dated Mar. 6, 2006.

* cited by examiner

*Primary Examiner*—Vu Le
*Assistant Examiner*—Amara Abdi
(74) *Attorney, Agent, or Firm*—Harness, Dickey & Pierce, P.L.C.

(57) ABSTRACT

A method is disclosed for identification of a contrasted blood vessel in digital 3D image data, the method using a generic region-growing algorithm with several steps, for which among other things seed points are searched for and, in dependence on a current threshold value, are assigned to corresponding seed point sets. The number of seed points which are associated during a specific section of the method to the same seed point set with the threshold value is recorded and a leakage signal is produced if the number exceeds a maximum value. When the leakage signal occurs, those seed points which have been associated with the threshold value during that section are not stored as vessel voxels, the method is terminated at the location of the leakage and the remaining method is continued.

10 Claims, 6 Drawing Sheets

METHOD FOR IDENTIFICATION OF A CONTRASTED BLOOD VESSEL IN DIGITAL IMAGE DATA

PRIORITY STATEMENT

The present application hereby claims priority under 35 U.S.C. §119 on German patent application number DE 10 2005 039 685.2 filed Aug. 22, 2005, the entire contents of which is hereby incorporated herein by reference.

FIELD

The invention generally relates to a method for identification of a contrasted blood vessel in digital image data obtained during 3D angiography.

BACKGROUND

Coronary blood vessel illnesses are one of the main causes of death for people throughout the entire industrial world. A heart malfunction is in this case caused mainly by abnormal constrictions, that is to say stenoses, in the coronary arteries. This often leads to a life-threatening myocardial infarction.

Technical improvements in methods such as spiral CT (Multi-Slice Cardiac Computed Tomography—MSCT), have recently made it possible to produce three-dimensional images of the heart with high position resolution in the sub-millimeter range. In this case, 64 parallel slice displays of the interior of the patient, for example of the chest area with the heart, are recorded within a time window of about 20 seconds. In particular, this makes it possible to display coronary arteries by intravenous injection of a contrast agent. This technique is known, for example, as 3D angiography (Computed Tomography Angiography—CTA). An imaging method such as this results in a digital 3D image data record of the patient.

In order to allow this record to be evaluated to determine the state of the heart or of the coronary vessels of the patient, it is necessary to identify and to display with high contrast the so-called coronary tree from the image data. The coronary tree in this case represents the totality of the coronary arteries or vessels without the other image information contained in the image data record. In other words, the aim is to carry out an extraction process from the image data of the coronary tree in such a manner that this can be displayed or measured, for example on its own, so to speak in empty space. Such processing of the coronary tree from the image data, which is also referred to as segmentation in specialist circles, will always be referred to as identification in the following text.

The quality of this identification is critical for subsequent medical diagnosis, for example the evaluation of the presence or the degree of vessel stenoses. Vessel stenoses are created by fat deposits, calcium deposits, aneurisms or other anatomical abnormalities, such as the lack of a coronary vessel or the like.

In addition to the process of finding the coronary blood vessels, that is to say just the confirmation of a diagnosis, their qualitative and quantitative analysis is also very useful, for example for planning the treatment before a required action, such as the insertion of a stent. In this case, by way of example, it is possible to determine the length of the stent, the length of catheters that may be required or the size of a bypass, even prior to an operation.

The identification of corresponding blood vessels in medical image data represents a major requirement, because the structures of the blood vessels are often very thin. For example, the diameter of blood vessels often covers only a small number of pixels or voxels in the digital image data. A further difficulty in the identification process is the proximity of the blood vessels to be identified to ventricles or atria which are likewise displayed with high contrast in the image data. Measurement noise and image interference, furthermore, require robust methods and algorithms for appropriate image processing.

A large number of methods have therefore been developed for identification of blood vessels in medical 2D or 3D images and image data.

One class of methods is based on so-called neighborhood differences, which are calculated from the image data. The major disadvantage of these methods is their critical dependency on noise in the image data.

Furthermore, methods exist based on deformable models with or without shape originals. The aim of the most models and methods in this case is to identify tube-like structures, but they have problems or fail in the identification of vessel branches in the coronary tree. Furthermore, shape models require a labor-intensive training phase on a large representative database of known image data with manually segmented vessel or coronary trees. Abnormal vessel trees (which, however, represent the most difficult and most critical case in medical practice) are often incorrectly segmented since they differ too much from the average pattern or the average shape model. Although model-based methods are considerably more robust to image noise than those mentioned above, most of these methods are not suitable for 3D analysis. This is also due to the fact that they are highly computation intensive.

Line and contour algorithms, in contrast, extract or identify only the center line of a blood vessel in image data, but not the entire vessel volume or volumes. Furthermore, techniques such as these require very good manual initialization. They therefore require a considerable amount of preparatory work by a very highly experienced user, such as a vascular surgeon. By way of example, the setting of appropriate markers for initialization of a method such as this is highly complex in practice, particularly in the 3D field.

One very widely used and fundamental algorithm is the so-called region growing or growth process, which is in general widespread use for the segmentation of image data and is already in use for vessel identification and segmentation, for example on the basis of [Boskamp, Tobias et al., "New Vessel Analysis Tool for Morphometric Quantification and Visualization of vessels in CT and MR Imaging Data Sets", Radio-Graphics, Vol. 24, No. 1, pages 287-297, published online, 2005].

The method operates for 2D or 3D situations, and is in this case based on the brightness, color or gray-scale values of the voxels in the image data. The basic assumption of the method in this case is that the voxels which are located close to one another and have similar brightness values are very highly probably associated with the same object. Without any restriction to generality, the following text is based on the assumption that contrasted vessels, that is to say blood vessels which have been enhanced by contrast agent are displayed more brightly in the image data than surrounding tissue or the like, and that brighter voxels have higher gray-scale or intensity values. The 3D image data to be segmented comprises pure gray-scale images, that is to say not color images. The gray-scale values of the voxels are displayed in Hounsfield units.

It is generally first of all convenient to add a first seed point sp, that is to say a single image voxel, to an empty seed point set $SP_T$. T is in this case the gray-scale value of the seed point. Starting from this, the method segments the image data and identifies the blood vessels by checking voxels nsp which are adjacent to the seed point sp step-by-step to determine whether they are potential vessel voxels. Vessel voxels such as these are added as potential seed points to the seed point sets $SP_T$, on the basis of their gray-scale values I. As described below, correspondingly stored seed points are processed when T assumes the corresponding value I.

If all neighbours have been checked for a threshold value T, the seed point is itself added to an empty segmented region R. The region R represents the growing vessel tree.

An overall interval of value $T_{max} \geq T \geq T_{min}$ is in general selected for corresponding thresholds or threshold values T, with the current threshold value T being the reduced step-by-step during the course of the method.

When no further adjacent voxels nsp can be found to the already segmented region R whose intensity is greater than the current threshold value T, this threshold value T is reduced by a predetermined step width, and a further method run is carried out with the modified threshold value T.

Seed points which are segmented, that is to say have been associated with the set R are in this case marked in the normal manner with the corresponding threshold value T at which they were identified. This creates a result R which is subdivided on the basis of intensity values and allows step-by-step removal of already segmented regions, even after processing of the entire algorithm.

The maximum threshold value $T_{max}$ is in this case the intensity of the first seed point, which was determined manually. The minimum threshold value for $T_{min}$ is defined interactively by the user. The segmentation is carried out over the entire threshold interval $T_{min}$ to $T_{max}$.

The user can admittedly reduce the number of incorrect segmentations, for example of ventricles, by increasing the minimum threshold value $T_{min}$. However, this has the disadvantage that all of the blood vessels which have been identified correctly but have a lower intensity than $T_{min}$ likewise disappear from the result. If the algorithm branches during the search process into areas such as the left-hand ventricle with a high threshold value, only a fraction of the vessels to be segmented, specifically that of the very bright vessels, can therefore be segmented, without reaching large areas of incorrect segmentations.

The growth algorithm which is known from the prior art will now be explained in detail with reference to FIG. 9.

First of all, in a start step 300, a user who is not shown manually selects a first voxel as the seed point sp in 3D image data, which is not shown. The gray-scale value I of this seed point sp is selected as the maximum threshold value $T_{max}$. The seed point sp is then written as the only seed point to the set $SP_{Tmax}$. The user also defines the lower threshold value limit $T_{min}$ on the basis of his empirical values.

At the start of the loop 302a, the value range is first of all defined for the current threshold value T between the upper threshold value limit $T_{max}$ and the lower threshold value limit $T_{min}$, in which case the current threshold value T initially assumes the upper threshold limit $T_{max}$. The first seed point sp from the seed point set $SP_T$ is once again chosen at the start of the following loop 304a, and thus initially corresponds to the abovementioned set $SP_{Tmax}$. At the start of the following loop 306a, the first adjacent voxel nsp of the seed point sp to the seed point sp which has just been selected is once again selected from the set of adjacent voxels which are directly adjacent to sp.

In the branch 308, a check is now carried out for the adjacent voxel nsp to determine whether its brightness value or intensity value HU(nsp) is greater than or equal to the lower threshold value limit $T_{min}$. If this criterion is satisfied, the adjacent voxel nsp is written as the new seed point to a seed point set $SP_T$, or is added to it, in the step 311 in the YES branch 310. The threshold value I of the seed point set is in this case determined from the minimum intensity of the adjacent voxel HU(nsp) and the current threshold value T. In contrast, nothing further is done in the corresponding NO branch 312.

A check is then carried out at the end of the loop 306b to determine whether a further adjacent voxel nsp to the current seed point sp exists. If YES, this is selected and the algorithm jumps back to the start of the loop 306a, but if NO, the seed point sp is added to the result set R in step 314, with the seed point sp being marked with the current threshold value T. Furthermore, sp is removed from the seed point set $SP_T$, and its processing is thus complete.

A check is then carried out at the end of the loop 304b to determine whether there are any further seed points sp in the seed point set $SP_T$. If YES, a jump is made to the start of the loop 304a, and the next seed point is selected from the set $SP_T$. If NO, a jump is made to the end of the loop 302b, in which the current threshold value T is reduced by a fixed step width, in the present example by one gray-level step, in the direction of $T_{min}$, and a jump is then made to the start of the loop 302a.

The algorithm ends after the last method run with the current threshold value $T=T_{min}$.

The result set R now contains the segmented vessel tree, specifically all of the seed points sp which have been determined during the course of the growth algorithm, as well as the start seed point sp from the start step 300, with each seed point sp being associated with the current threshold value T at the time it was added to the result set R.

Although the regional growing method has the disadvantages mentioned above, its fundamental advantages are nevertheless the processing speed and the simplicity for implementation in a computer program.

SUMMARY

At least one embodiment of the present invention is directed to specifying an appropriately improved method for identification of a contrasted blood vessel in digital 3D image data with respect to suppressing a leakage.

Steps a) to h) describe the basic form of the generic growth algorithm which is known from the prior art and has already been explained above with reference to FIG. 9.

At least one embodiment of the invention is in this case based on the discovery that known methods which are based on this algorithm have until now been carried out and used without taking into account the structures which are to be segmented.

According to at least one embodiment of the invention, therefore, at least one of the method steps a) to h) is carried out taking into account prior knowledge about the blood vessel to be identified. Prior knowledge about the blood vessel to be identified may, for example, be its basic shape, size, diameter or the like. By way of example, it is known for coronary arteries that their diameter cannot increase significantly in the axial direction, starting from the ventricle. Thus, if regions with an extraordinary large diameter with respect to known blood vessels are formed during the segmentation of the blood vessel in the course of at least one embodiment of the method, then it can be assumed that these are incorrect segmentations, and do not relate to the blood vessel to be identified in the patient. According to at least one embodiment of the invention, knowledge such as this is integrated in steps a) to h) by modification and extension to these steps, in order in this way to arrive at the method according to at least one embodiment of the invention.

The advantages which have already been explained above of the growth algorithm are nevertheless intrinsically retained in the method. However, the segmentation of a coronary tree from, for example, computer-tomography angiography data is considerably improved. The method of at least one embodiment can thus be carried out quickly and therefore even using large 3D data records. It can therefore be used for everyday clinical purposes. The risk of incorrect segmentations is reduced to a very major extent, since the nature of the incorrect segmentations which occur most frequently is known in advance, and these can be detected and trapped by appropriate method steps based on the prior knowledge. The method according to at least one embodiment of the invention can be carried out not only using CTA data but also, for example, using the data from magnetic-resonance angiography (MRA) or the like. Furthermore, the method is not restricted to the segmentation of coronary arteries, but can also be used for other blood vessels, for example those in the back or brain of a patient.

In the method according to at least one embodiment of the invention, the number of seed points which are associated with the same threshold value during one specific section of the method can be recorded, and a leakage signal can be produced if the number exceeds a maximum value, and the seed points which have been associated with that threshold value during that section are not stored as vessel voxels.

One method section is in this case a part of the method of at least one embodiment which is defined as required but permanently, for example all of the method steps c) which are carried out for one and the same current threshold value.

If a particularly large number of seed points are associated with the same threshold value in the specific method section, that is to say the number of them exceeds the maximum value, then a region is being segmented which it is known cannot be associated with that blood vessel. For this method variant, the prior knowledge about the blood vessel includes a specific section of the blood vessel being segmented in a specific method section, and assuming only a specific maximum volume. The number of newly found seed points is thus also restricted in this method section.

Only a specific maximum number of seed points may therefore be recorded when only the intended blood vessel is actually correctly identified. Otherwise, it can be assumed that the method identifies regions outside the blood vessel. This therefore relates to so-called "leakage" since the algorithm in other words migrates away from the blood vessel during the identification process.

The leakage signal is therefore produced in this case. This can be evaluated and used further in many ways. For example, the entire method can be ended, or else a suitable reaction can be carried out in response to the leakage.

On the basis of prior knowledge, it is known that the number of seed points which are identified in the corresponding method section and exceed the maximum value cannot be associated with the same blood vessel, or only some of them can. These are therefore also not stored as vessel voxels. Thus, either seed points that are newly to be added are not marked and stored as vessel voxels, and that already stored seed points or vessel voxels are removed again, in a corresponding manner, from the set of vessel voxels.

The leakage identification method variant that has just been mentioned can also be made specific for the situation in which a blood vessel with a plurality of branches is identified as the blood vessel. If the number of seed points associated with the same threshold value then exceeds the maximum value only in a first branch, then the method can be terminated for the first branch, and can be continued for the remaining branches. The method is thus not terminated completely in the case of the leakage identification mentioned above, but is essentially terminated only at that point at which the leakage occurred, that is to say an extraordinary large number of seed points had been newly identified. The growth process can then be continued in the remaining branches.

By way of example, an appropriate marking or a marker is set at the point of the leakage in the 3D image data, in order to terminate the segmentation at this point, or in other words to seal the leakage. The rest of the vessel tree of the blood vessel, which is not located in the branch that produced the leakage, can thus continue to grow without impediment.

For at least one subarea of the stored vessel voxels, meaning a delimited volume, the total number of vessel voxels N can be determined in that volume, the number of inner vessel voxels $N_I$ in the volume can be determined, all or of whose adjacent image voxels are likewise vessel voxels, a density value $d=N_I/N$ can be determined for that for the volume and, if the density value d is less than a limit value $d_{min}$, that volume of the stored vessel voxels is not stored any longer, meaning it is deleted.

This method variant is based on the knowledge that so-called voxel sets with gaps or sparse voxel sets are produced, for example, during the segmentation of a patient's ventricle. In this case, vessel voxels occupy a specific limited volume, although all of the image voxels in the interior of that volume are not identified as vessel voxels. In other words, numerous points of non-vessel voxels are located in the volume, so that, in other words, this represents a structure with gaps rather than a solid structure composed only of vessel voxels. With the method variant currently being described, structures such as these can be eliminated from the solution set of vessel voxels in that vessel voxels such as these are not stored, or vessel voxels which have already been stored are deleted again.

The maximum value of the intensity values of a predetermined number of image voxels surrounding the seed point from step a) can be selected in step b). The prior knowledge that is used is in this case as follows: owing to noise, the brightnesses or intensities of adjacent image voxels often differ to a major extent even though their brightness should actually be the same, since they belong to the same structure, for example a blood vessel. Since one specific image voxel is selected as the seed point in step b), its intensity, which is associated with that threshold value, is thus highly dependent on the actually selected image voxel. If the intensity of the selected image voxel which is located in an area of the 3D image data that is known to be associated with that vessel is very low even at the start of the method, for example because of noise, in comparison to other image voxels located in that blood vessel, a very large number of image voxels will be marked as vessel voxels even in the first method section, specifically the section with the maximum threshold value. This is because these are then all of the image voxels which are associated with that blood vessel and have at least the same brightness as the start voxel. This leads to a solution set with little differentiation, if leakages or sparse voxel sets are identified, since all of the vessel voxels from the first method section are associated with the—relatively low—threshold value.

The choice of the maximum intensity value from the area surrounding the first seed point according to at least one embodiment of the invention, means that the actual maximum intensity value of the blood vessel is used for the method at the point (which is often selected manually) of the first seed point within the image noise in the 3D image data. The method thus starts at the considerably higher maximum threshold value, which results in a considerably more differentiated result set for the identified blood vessel, since relatively dark image voxels are already associated with other solution subsets.

After completion of step h) in a first method run, the identified blood vessel can be stored as a first vessel element, a second method run can be started with step a), a second seed point can be selected in step b), a second method run can be carried out with steps c) to h), and the blood vessel which was identified in step h) as the second vessel element can be combined with the first vessel element to form a common blood vessel.

A plurality of growth processes are thus carried out in parallel or successively, but in any case independently of one another, and are each started with a different seed point, specifically a first seed point and a second seed point, and thus in general lead to different vessel elements as the result. It is thus possible to identify even vessel trees which are not cohesive. In addition, the second method run, by way of example, can nevertheless thus be carried out completely, that is to say without any further leakage, despite or even in the event of the first method run being terminated for example because of a leakage as described above.

The method can be carried out in the course of 3D angiography and/or contrast-agent computer tomography. The identification of the blood vessel in the 3D image data that is obtained during this process is particularly important for 3D angiography and contrast-agent CT, and can be considerably improved over the prior art by way of the method according to at least one embodiment of the invention.

The coronary blood vessels of a patient can be identified as the blood vessel. A large amount of prior knowledge is available in particular for the coronary blood vessels, so that the growth process according to the prior art can be adapted and improved particularly well and effectively by taking account of prior knowledge according to at least one embodiment of the invention.

Knowledge about the coronary blood vessels, ventricles, their atria and the aorta of the patient can be taken into account as prior knowledge for the identification of coronary blood vessels. Ventricles and atria as well as aorta in particular differ considerably from coronary blood vessels in terms of their features, so that the method variants according to at least one embodiment of the invention produce particularly good results. For example, appropriate leakage identification is possible particularly easily by segmentation or identification of ventricles, their atria or aorta instead of the coronary blood vessels.

The area in which the current threshold value is varied in the course of the method may be made dependent on the start value for the current threshold value, that is to say on the value of the threshold value as determined in step a). By way of example, the use of a sigmoid function allows start threshold values of different brightness to be associated with different ranges of threshold values, passing through the current threshold value. Start points in particularly bright or particularly dark blood vessels to be identified can thus lead to considerably better segmentation results. Because the value range for the current threshold value is dependent on the start value, image data from widely differing sources can be segmented equally well. Different patient parameters and image recording parameters are thus also taken into account by the method according to at least one embodiment of the invention, for obtaining the 3D image data.

BRIEF DESCRIPTION OF THE DRAWINGS

Reference should be made to the example embodiments in the drawings, for a further description of the invention. In the drawings, in each case in the form of a schematic outline sketch.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

Figure 1:
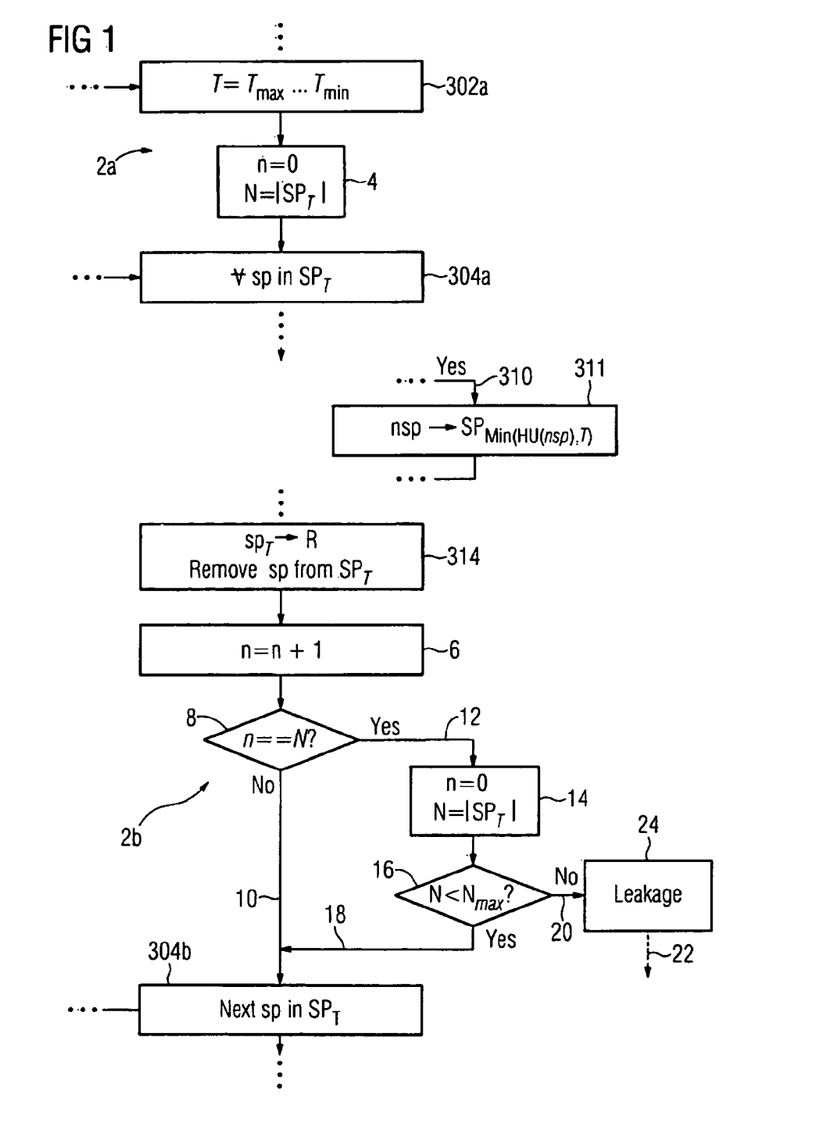
FIG. 1 shows a detail from a flowchart for a method for segmentation of blood vessels using 3D image data.
Figure 7:
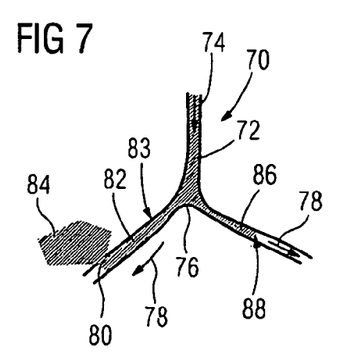
FIG. 7 shows a detail from a blood vessel to be segmented, with a segmentation result leading to a leakage point.
Figure 9:
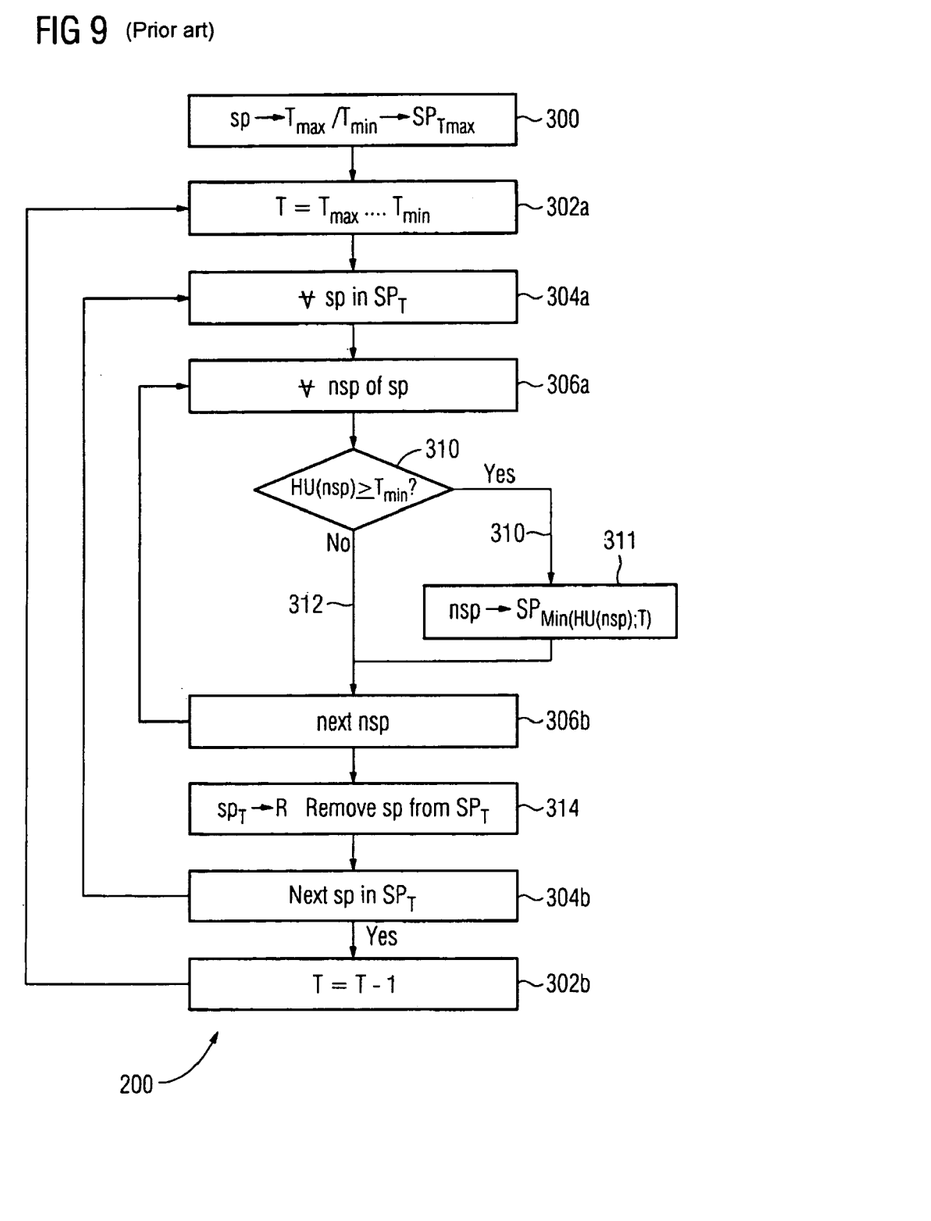
FIG. 9 shows a flowchart for a method for segmentation of blood vessels using 3D image data, according to the prior art.

FIG. 1 shows a first embodiment of a development (according to the invention) of the method according to the prior art from FIG. 9. So-called "en-bloc" leakage identification is carried out in FIG. 1. FIG. 7 shows a leakage 84 such as this in a vessel 82. The origin of the leakage will be explained in detail further below.

For leakage identification purposes, two method sections 2a, 2b are in FIG. 1 inserted into the known method as shown in FIG. 9. In this case, method section 2a is located between the starts of the loops 302a and 304a. The method section 2b between the step 314 and the end of the loop 304b. A numerical variable n is set to the value zero in a step 4 in the method section 2a, and the size of the currently applicable seed point set $SP_T$, that is to say the number of seed points sp contained in it, is determined as $|SP_T|$ in the variable N.

The known method as shown in FIG. 9 is then carried out as far as step 314. In this case, as explained, all of the neighbors nsp are checked for a fixed selected seed point sp in the seed point set $SP_T$ and, if appropriate, are added as new seed points to a seed point set $SP_{min(HU(nsp);\ T)}$ in step 311.

According to at least one embodiment of the invention, new seed points nsp are in this case each attached to the end of the corresponding seed point set $SP_{min(HU(nsp);\ T)}$. In addition, in the set $SP_T$, the processing at the start of the loop 304a for the seed points sp to be dealt with always starts from the start of the set. Seed point sets SP thus form sets in the sense of a FiFo stack, so that, to be precise, the first seed points sp to be added and the most recent set points sp to be added are also respectively processed first and last in the method.

After the step 314, all of the neighbors of the current seed point sp are investigated, the seed point with the current threshold value T is identified, the result set R is added, and is deleted from the seed point set $SP_T$. The numerical variable n is then incremented by the value one according to the invention, in step 6. Thus, n describes the number of seed points processed so far in step 314.

A check is now carried out in the branch 8 to determine whether all of the N seed points determined in step 4, that is to say all of the seed points sp contained in the seed point set $SP_T$ at the start of the run, have been processed, that is to say whether n is equal to N. If this is not yet the case, the process continues with the end of the loop 304b in the NO branch 10, and the next seed point sp from the seed point set $SP_T$ is processed in the known manner.

However, once all of the N seed points sp determined in step 4 have been processed, a jump is made to the YES branch 12, where a check is carried out to determine whether the seed point set $SP_T$ has grown to an extremely large extent. For this purpose, in step 14, the numerical variable n is first of all once again set to the value zero, and the current size of the seed point set $SP_T$ is determined as N. Since, by this time, all n seed points have been removed from the set $SP_T$ in the respective steps 314 since the step 4, N thus indicates the total number of seed points sp which have been added to the set $SP_T$ since step 4.

A check is carried out in the branch 16 to determine whether the variable N is less than a previously defined maximum permissible number of added seed points $N_{max}$. If this is the case, no extraordinary large seed points sp have been added to the set $SP_T$ between the steps 4 and 14. This leads to the conclusion that the method has not jumped into a leakage, as in FIG. 7. The YES branch 18 is therefore followed and the method continues as normal with the end of the loop 304b.

If, however, at least $N_{max}$ seed points sp have been added to the set $SP_T$ it can be assumed that this has happened as a result of a leakage as in FIG. 7. The process thus jumps from the branch 16 to the NO branch 20, in response to which the method identifies an "en-bloc" leakage in step 24.

Figure 2:
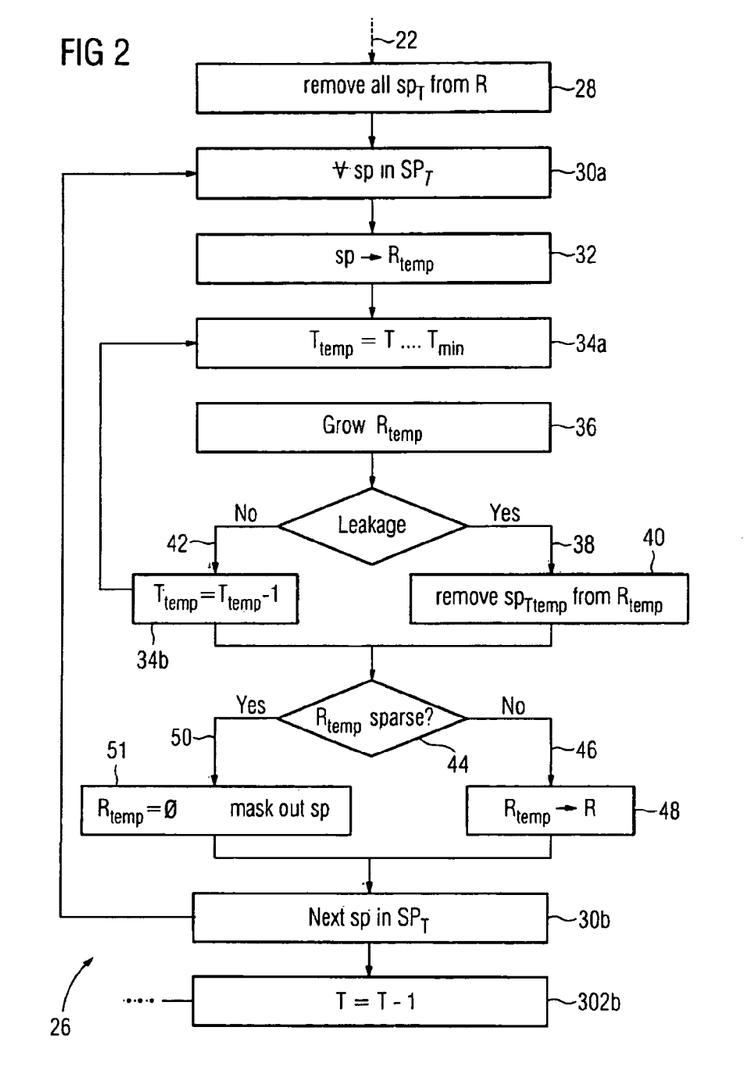
FIG. 2 shows a flowchart of one alternative method section for the method from FIG. 1.

A first embodiment of the method according to the invention stops at this point. However, as is indicated by the arrow 22, a jump can also be made at this point to a further method section 26, which is illustrated in FIG. 2 and which is then carried out as an alternative to the termination of the method in step 24, as already mentioned.

After detection of the leakage in step 24, all of the seed points sp which have been added since the start of the loop 302a are then removed from the result set R, in step 28. In other words, this represents the entire previous segmentation result with the current threshold value T. The result set R is thus, so to speak, reset to the state which it was in after processing of the threshold value T+1, and the segmentation process for the threshold value T is carried out one again in an alternative manner.

At the start of the loop 30a, which is identical to the start of the loop 304a, the first seed point sp once again is now selected from the seed point set $SP_T$, but on this occasion it is added to a new, initially empty, result set $R_{temp}$ in a step 32. A temporary threshold value $T_{temp}$, which is equal to the current threshold value T is now set at the start of a loop 34a, which is similar to the start of the loop 302a, and is reduced in the normal manner down to $T_{min}$ in the course of the method section 26.

The growth method shown in FIG. 1 is then carried out in a virtually identical manner in method section 36. The only difference is that seed points in step 314 from FIG. 1 are added to the result set $R_{temp}$ rather than to the result set R.

The method section 2b from FIG. 1 is also slightly modified: the NO branch 20 from FIG. 1 corresponds to the YES branch 38 in FIG. 2, and leads to the step 40 in FIG. 2, rather than to the step 24 in FIG. 1. In step 40, that is to say if a leakage is detected, all of the seed points $sp_{T,\ temp}$ which have been added for the value $T_{temp}$ to the result set $R_{temp}$ since the start of the loop 34a are removed again. Furthermore, the NO branch 42, which corresponds to the YES branch 18 and to the NO branch 10 in FIG. 1, does not lead in FIG. 2 to the end of the loop 304b from FIG. 1, but to the end of the loop 34, in which the temporary threshold value from $T_{temp}$ is decremented by one gray-scale step.

After passing through all of the temporary threshold values $T_{temp}$ of T, that is to say the current gray-scale value of the start of the loop 302a from FIG. 1, in which the leakage was discovered in step 24, as far as $T_{min}$ at the end of the loop 34b or after the step 40, the decision step 44 is carried out in FIG. 2.

A check is carried out in the decision step 44 to determine whether the result set $R_{temp}$ created so far has a structure with gaps, also referred to as a "sparse" structure. For this purpose, a density value d is determined for the seed points sp contained in the result set $R_{temp}$ in the form $d=N_I/N$, where $N=|R_{temp}|$ represents the number of voxels or seed points sp contained in $R_{temp}$, and $N_I$ describes the number of inner voxels in $R_{temp}$. Inner voxels are voxels, all of whose neighbors likewise belong to $R_{temp}$. If the determined density value d is greater than or equal to a previously defined threshold value $d_{min}$, the segmentation result $R_{temp}$ is "dense" enough, that is to say this is not a "sparse" region. A jump is then made to the NO branch 46 in FIG. 2, where the determined temporary result $R_{temp}$ is added to the total result R in step 48.

If, in contrast, $R_{temp}$ is a set of gaps, that is to say "sparsely" distributed voxels, that is to say $d<d_{min}$, a jump is made to the YES branch 50, where the set $R_{temp}$ is first of all emptied in step 52, since the segmentation in the method section 26 has not produced a sensible result with that sparse voxel set. Furthermore, the current seed point sp is masked out, that is to say this seed point sp is not processed any further throughout the course of the rest of the entire method, since this was responsible for the method branching into the result area $R_{temp}$ distributed with gaps.

The method section 26 then branches to the end of the loop 30b, following which the next seed point sp from the set $SP_T$ is processed. Once the last seed point sp has been processed in method section 26, the method jumps to the end of the loop 302b or to the start of the loop 302a in FIG. 1 or FIG. 9, respectively. This completes the handling of the leakage that was found in step 24 in FIG. 1. The method from FIG. 1 is continued as normal.

Figure 3:
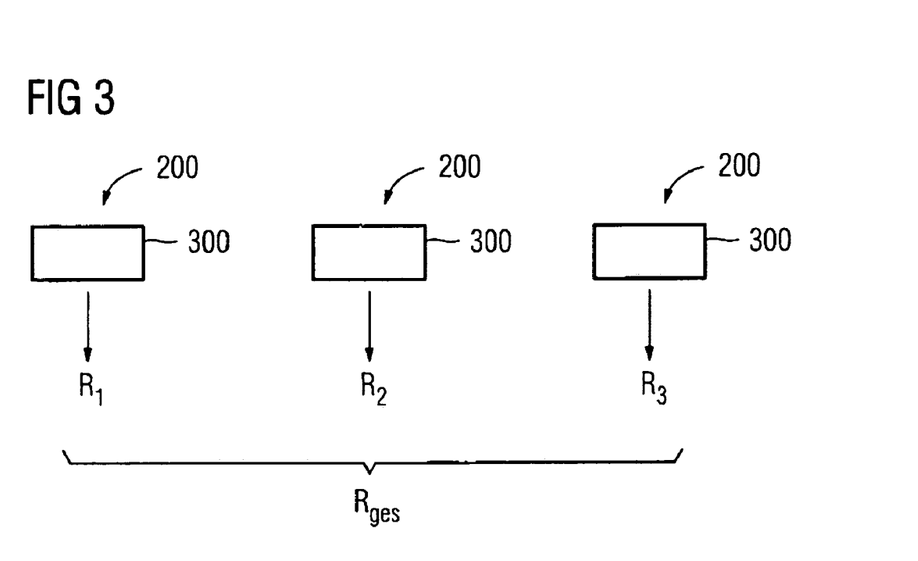
FIG. 3 shows a further alternative for the methods from FIG. 1 and FIG. 2.

As a further method variant, a plurality of overall growth processes 200 from FIG. 9 can be carried out in parallel and/or successively. This procedure is illustrated in FIG. 3. The modified growth process according to at least one embodiment of the invention may, of course, also be used while carrying out the growth process 200. The individual growth processes 200 in this case differ in the choice of the first seed point sp in step 300. Each individual growth process 200 then produces its own result set $R_1$, $R_2$ and $R_3$ as the result. These result sets $R_1$ to $R_3$ are joined together in a final step to form an overall result set $R_{tot}$.

Figure 4:
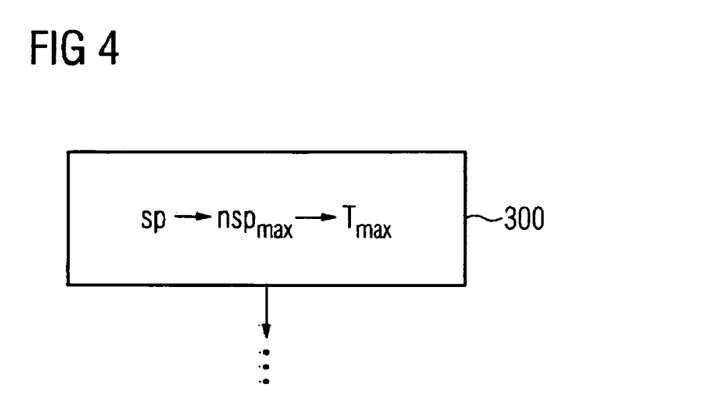
FIG. 4 shows a flowchart of an alternative method variant relating to FIGS. 1 to 3.

FIG. 4 illustrates a further method variant. In this case, one seed point sp is once again selected manually as the start voxel in the start step 300. However, rather than selecting the intensity or the gray-scale value of the seed point sp as the maximum threshold value $T_{max}$, the maximum intensity of a voxel from a previously defined group of adjacent voxels for the seed point sp is selected as this maximum threshold value $T_{max}$. In this case, by way of example, all of the voxels within a neighborhood of 7×7×3 can be considered as neighbors in the three spatial directions around sp, if the entire voxel volume is formed from slice images, and 7×7 neighbors can be selected within each 2D slice image, and the two adjacent slices, that is to say a total of three, can be taken into account for the slice for the start voxel.

Figure 5:
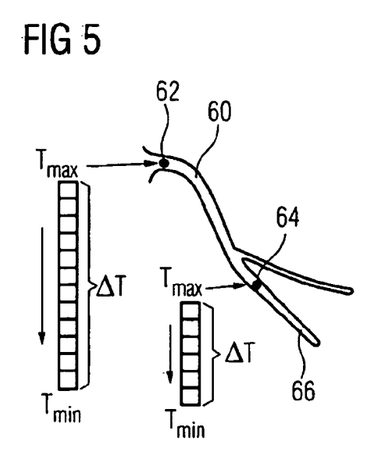
FIG. 5 shows a detail from a blood vessel with seed points placed in it and with associated threshold values.
Figure 6:
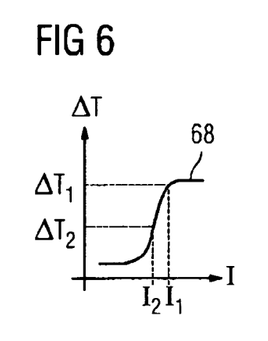
FIG. 6 shows a sigmoid function relating to the determination of the threshold values from FIG. 5.

A further method variant will be explained with reference to FIG. 5, which shows a vessel tree 60 on which, as is shown in FIG. 3, two different method runs of the growth process 200 are carried out, with differently selected seed points 62 and 64. In this case, the first seed point 62 has the gray-scale value or the intensity I. As shown in the diagram in FIG. 6, the intensity $I_1$ of the seed point 62 is associated with a value $\Delta T_1 = T_{max} - T_{min}$ on the basis of a sigmoid function 68. Thus, $\Delta T_1$ gray-scale values between $T_{max}$ and $T_{min}$ at the start of the loop 302a and at the end of the loop 302b, respectively, are passed through in the corresponding method run 200.

In comparison to the first seed point 62, the second seed point 64 is located in a further-branched vessel 66 of the vessel tree 60. Thus, $I_2 < I_1$, for the intensity $I_2$ of the seed point 64. A smaller value $\Delta T_2$ is thus associated with the value $I_2$ as well on the basis of the sigmoid function 68 in FIG. 6. In the method run 200 associated with the seed point 64, fewer gray-scale values $\Delta T_2$ are passed through between $T_{max}$ and $T_{min}$ at the start of the loop 302a and at the end of the loop 302b, respectively, than in the case of the growth process 200 associated with the seed point 62.

FIG. 7 shows the branching of the growth process 200 in a vessel tree 70. The growth of the region R in the vessel 72 in this case takes place in the direction of the arrow 74. At the vessel branch 76, the segmented region R first of all grows in both possible branch directions, indicated by the arrows 78. At the point 80, the growth algorithm for the vessel 82 branches for the threshold value T into a leakage 84. Thus, the method must now add voxels to the region R which do not belong to the vessel 70 but, for example, to a bone structure or cavity adjacent to the vessel.

This leakage 84 is discovered in step 24 by way of the method according to an embodiment of the invention from FIG. 1, and the result element for the leakage 84 for the threshold value T is removed from the result R in step 28 as shown in FIG. 2. This leaves the segmentation result R from the threshold value T+1, which ends in the vessel 82 at the point 83, and in the vessel 86 at the point 88.

However, the region R in the vessel 86 can also continue to grow beyond the point 88 in the direction of the arrow 78 on the basis of the further temporary growth process, which is carried out in FIG. 2, in the method section 26, since no leakage has been found in this branch, and the seed points sp there are not masked out in the YES branch 50 or the step 51.

Figure 8:
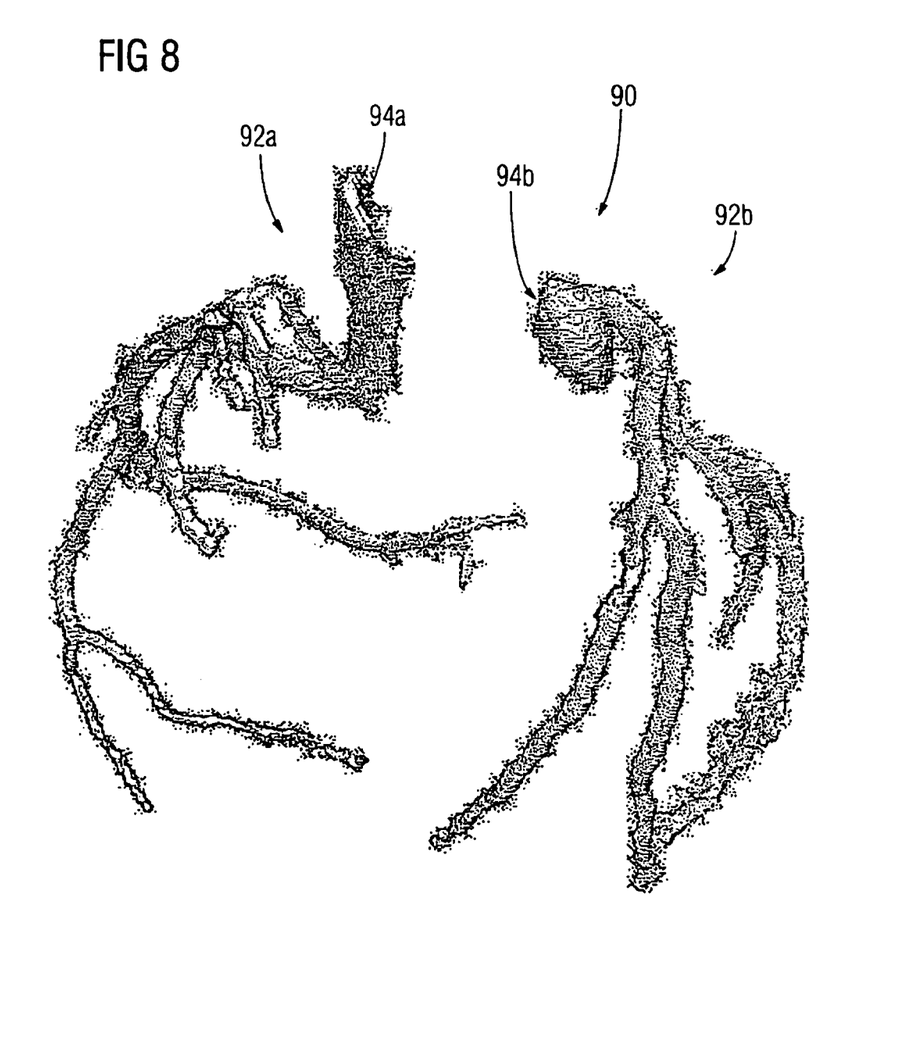
FIG. 8 shows a vessel tree as a segmentation result.

FIG. 8 shows, as the segmentation result $R_{tot}$, a vessel tree 90, which has been combined from two result elements R, specifically the left-hand and right-hand coronary arteries 92a,b of a human heart, which is not illustrated, with these result elements having been determined in two growth processes 200 carried out in parallel in FIG. 3. The seed points 94a,b for the corresponding processes were selected manually in the area of the aorta outlets of the left-hand and right-hand coronary arteries. The illustration in FIG. 8 was obtained from the segmentation result $R_{tot}$ by way of a so-called "volume-rendering" technique as an artificial three-dimensional perspective image from the 3D voxel data and image data, on the basis of which the method according to an embodiment of the invention was carried out.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for identification of a contrasted blood vessel in digital 3D image data, comprising:

a) selecting one image voxel, associated with the blood vessel, in the 3D image data as a seed point;

b) selecting, by a processor, an intensity of the seed point as a current threshold value for the intensity of image voxels, and associating the seed point to a seed point set with the current threshold value;

c) using, by a processor, a test criterion, for finding new seed points, to search for the new seed points in the image voxels which are adjacent to the seed point, and associating the new seed points to seed point sets as a function of their intensities and the current threshold value;

d) repeating, by a processor, step c) for the seed points of the seed point sets until no further seed points can be found with the current threshold value;

e) storing, on a computer readable medium, the seed points which have been found as vessel voxels associated with that blood vessel, and marking the vessel voxels with the current threshold value;

f) reducing, by a processor, the current threshold value;

g) repeating, by a processor, steps c) to f) until a termination criterion is satisfied;

h) identifying, by a processor, the blood vessel as the set of all vessel voxels in the image data, wherein a number of seed points associated during one specific section of the method to a same seed point set with the threshold value is recorded, a leakage signal is produced if the number of seed points exceeds a maximum value, and when the leakage signal occurs, those seed points which have been associated with the threshold value during that section are not stored as vessel voxels, the method is terminated at the location of the leakage and the remaining method is continued.

2. The method as claimed in claim 1, wherein a blood vessel having a plurality of branches is identified as the blood vessel, and the number of seed points which are associated with the same seed point set with the threshold value exceeds the maximum value only in a first branch at which maximum value: the method is terminated for the first branch; and the method is continued for the remaining branches.

3. The method as claimed in claim 1, wherein for at least one volume delimited from the stored vessel voxels:

the total number (N) of image voxels in that volume is determined;

the number ($N_1$) of inner vessel voxels in the volume is determined, all of whose adjacent image voxels are likewise vessel voxels;

a density value (d) is determined for that volume using $d = N_1/N$; and if the density value (d) is less than a limit value, that volume of the stored vessel voxels is not stored any longer.

4. The method as claimed in claim 1, wherein a maximum value of intensity values of a number of image voxels surrounding the seed point from step a) is selected as the threshold value in step b).

5. The method as claimed in claim 1, wherein after completion of step h) in a first method run, the identified blood vessel is stored as a first vessel element, a second method run is started with step a), a second seed point is selected in step b), a second method run is carried out with the steps c) to h), that blood vessel which is identified in step h) of the second method run as a second vessel element is combined with the first vessel element to form a common blood vessel.

6. The method as claimed in claim 1, wherein the method is carried out in the course of at least one of 3D angiography and contrast-agent computer tomography.

7. The method as claimed in claim 1, wherein the coronary blood vessels of a patient are identified as the blood vessel.

8. The method as claimed in claim 1, wherein an area in which the current threshold value is varied in the course of the method in step f), starting from the current threshold value in step a), is made dependent on the current threshold value determined in step a).

9. The method as claimed in claim 2, wherein for at least one volume delimited from the stored vessel voxels:

a total number (N) of image voxels in that volume is determined;

a number ($N_1$) of inner vessel voxels in the volume is determined, all of whose adjacent image voxels are likewise vessel voxels;

a density value (d) is determined for that volume using $d = N_1/N$; and if the density value (d) is less than a limit value, that volume of the stored vessel voxels is not stored any longer.

10. A computer readable medium having computer readable instructions stored thereon, for execution by a processor, to perform the method of claim 1.

* * * * *